April 27, 1954

J. B. KELLEY ET AL 2,677,094

COMMUTATING DEVICE

Filed Oct. 6, 1948

INVENTORS
Joseph B. Kelley and
BY Frederick L. Maltby

E. C. Sanborn
Attorney

Patented Apr. 27, 1954

2,677,094

UNITED STATES PATENT OFFICE 2,677,094

COMMUTATING DEVICE

Joseph B. Kelley, Thomaston, and Frederick L. Maltby, Naugatuck, Conn., assignors to The Bristol Company, Waterbury, Conn., a corporation of Connecticut Application October 6, 1948, Serial No. 53,082

15 Claims. (Cl. 321—49)

This invention relates to means for detecting small unidirectional potentials and producing therefrom alternating potentials of proportional magnitude and of phase position dependent upon the polarity of said unidirectional potentials. In direct-current measuring networks such as potentiometers and bridges it is sometimes customary to determine unbalance conditions by the expedient of interrupting, commutating or "chopping" the potential to be detected, and thereby rendering it suitable to amplification by means of an electronic network, usually including one or more transformers. The output of such a transformer-amplifier combination may then be utilized in a suitable alternating-current motor for rebalancing the network, or otherwise reducing to zero the potential applied to the detector.

In the co-pending application Serial No. 53,077 filed by F. L. Maltby, October 6, 1948, apparatus is disclosed for eliminating from a detector of the above nature errors due to thermoelectric potentials and to lack of uniformity in certain elements wherein a symmetrical structure is difficult to obtain. The present invention provides means to compensate for undesirable effects in the event of asymmetrical operation of the vibrator or other interrupting device embodied in the system. This lack of symmetry may be due to maladjustment of contacts or to strains or other mechanical faults developing in operation; and, if the non-uniformity be such that contact is made on one side of the circuit for a longer time from that on the other side of the circuit, the result may appear in the form of imperfect elimination of alternating potentials picked up by the detector circuit, resulting in a false balance and a corresponding error of measurement.

The general function of an interrupter or commutator in a balance detector system is to provide a current or voltage having an alternating component proportional to the direct-current quantity, and adaptable to amplification by electronic tube systems. Even though the switching action of such a device may result in a wave-form far from ideal for purposes of control or operation of motors, yet this fault may readily be eliminated by suitable filter circuits. If the input to such a device be pure direct-current, the fundamental of the alternating output will have a frequency corresponding to that of commutation, which frequency will characterize the wave as ultimately utilized. If the interrupter should have a unilateral characteristic, or if the commutating device should not be symmetrical in its action, it follows that this lack of symmetry will be reflected in the alternating output as a bias, or a direct-current component. Such a component may, of course, be eliminated by passing the output through a transformer; and the recovered alternating component may be amplified and utilized, despite the asymmetrical action of the inverter.

If the input to a symmetrical commutating device contains an alternating component of the same frequency as that of the switching action, the performance of the device will be that of a synchronous rectifier, with the result that the alternating input will appear in the output as a direct-current component, which, like that resulting from asymmetrical commutation of a direct current input may readily be eliminated. This output will also contain components of all even harmonics. If, however, the input to a commutating device having asymmetrical characteristics contain an alternating component of the same frequency as that of the commutating device, it follows that rectification will be imperfect, with the result that in the output potential there will appear an alternating component of said frequency, and depending in its magnitude upon the degree of asymmetry characterizing the operation of the commutator. The most common function of inverters of this class is to provide an alternating output which shall be a function of the direct-current input only, so that the output may be amplified and utilized in coaction with an alternating field of the same frequency to operate a balancing motor, whereby to reduce the input potential to zero. It follows, therefore, that the presence of the alternating component due to imperfectly rectified alternating input will tend to falsify the balance condition of the network, and thus introduce an error in measurement.

It is an object of the present invention to provide means whereby the effects of asymmetrical operation of a vibrating or commutating interrupter may be eliminated from the system and the effects of alternating current pick-up thus reduced to a negligible value.

While the present invention is herein set forth in combination with the device disclosed in said application of F. L. Maltby, it will be understood that its utility is not limited to that specific form of commutating detector, but that it may be used with the same extent of improvement, and often with an even greater advantage, as an accessory to corresponding apparatus previously known in the art of electrical measurement and control.

In carrying out the purposes of the present invention, it is proposed to place in series or parallel, with a portion of a circuit which is common to a pair of main contactors alternately acting to switch currents of potentials of opposite polarity, an auxiliary contact operating with twice the frequency of the main contactors, and serving in each half-cycle to maintain the portion of circuit in which it is connected inoperative during the times of engaging or disengaging of the main contactors. Thus, the main, or synchronous contactors serve only as pole-changers, and the double-frequency auxiliary contact performs the whole duty of switching, thus controlling successive pulses of opposite polarity in an identical manner and thereby eliminating any source of inequality which might originate due to asymmetrical timing of the main contacts.

Figure 1:
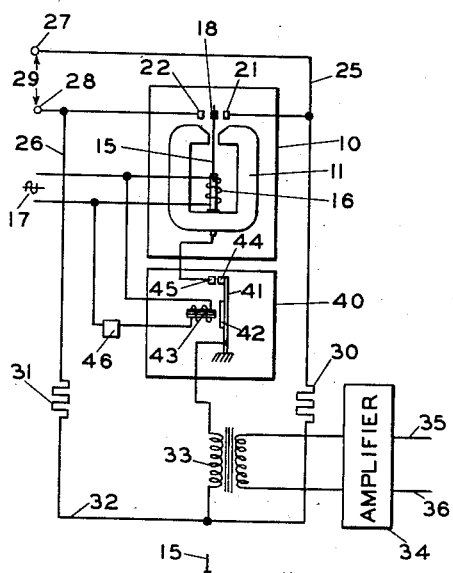
Fig. 1 is a diagrammatic representation of a form of the invention.

Referring, now, to Fig. 1 of the drawings:

The numeral 10 designates a vibrating contactor which may be identical in structure with that fully set forth in said Maltby application, and having a permanent magnet member 11 in whose field a reed 15 is caused to vibrate by alternating-current from a source 17, flowing in a winding 16 surrounding the same. Carried by the reed 15 is a double sided contact 18 adapted to be moved through a limited distance by a vibration of said reed, and alternately to engage stationary contacts 21 and 22.

Two conductors 25 and 26 are connected to terminals 27 and 28 respectively between which may be impressed from a source 29 a unidirectional potential to be converted into its alternating equivalent. The conductors 25 and 26 are electrically connected also to the stationary contacts 21 and 22 respectively, and are also connected in series with equal resistors 30 and 31 respectively to a common conductor 32. A transformer 33 has one end of its primary winding connected to the conductor 32 and the other end to the reed 15 in series with a vibrating contactor 40, presently to be described. The secondary winding of the transformer 33 is connected to the input terminals of a suitable amplifier 34 whose output terminals 35 and 36 may be connected to any suitable measuring or controlling circuit.

The vibrating contactor 40 is of the nonpolarized type, having a resilient reed 41 fixed at one end and carrying a ferromagnetic armature 42. An electromagnet 43 adapted to energization from an alternating-current source is positioned to act upon the armature 42, whereby the same will pass through a complete cycle of attraction and release for each pulse of current in the winding of magnet 43, without respect to the polarity of said pulse. Thus, it will be seen, that the reed 41 will tend to vibrate at a frequency double that of the exciting current in the magnet winding. A contact 44, carried by the reed 41 and movable therewith, is juxtaposed to a stationary contact 45, whereby to engage the same electrically upon each deflection of the reed. The winding 43 is connected to the same source 17 as the winding 16 in the contactor 10; and, if desired, a phase-shifting device 46 may be included in the circuit, whereby to establish suitable timing relationship between the reeds in the two contactors. The contacts 44 and 45 are connected in series between the reed 15 and the primary winding of the transformer 33.

Figure 3:
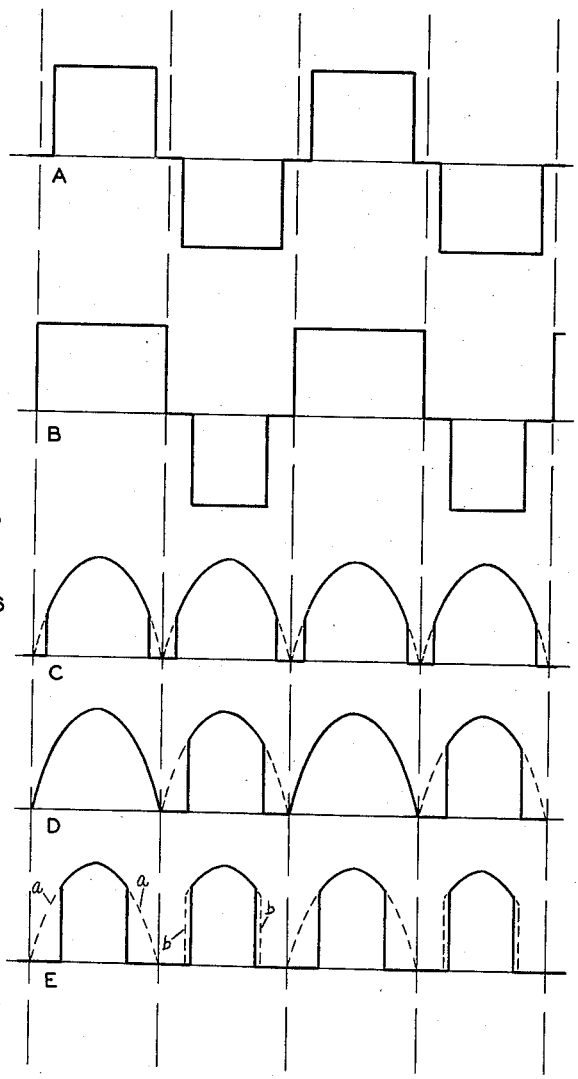
Fig. 3 is a graphical representation of certain phenomena attending the performance of the invention.

An understanding of the performance of a synchronous contactor, both when symmetrical, and when asymmetrical in its operation, will be obtained by reference to the graphs A, B, C and D in Fig. 3. The graph A represents the output voltage of a synchronous commutator of the type designated at 10 in Fig. 1 when operating symmetrically upon a pure direct-current input. It will be observed that the device functions solely as a reversing switch and that there is a brief interval of time betwen the connections representing the different polarities. Assuming for the moment the contacts 44 and 45 to be inactive, and to be maintained in a closed condition, the square-wave potential represented by the graph A is that which would be impressed upon the primary winding of the transformer 33; and the output of this transformer may be utilized for the operation of motors or control devices requiring a frequency identical to that of the source 17. The graph B represents the output of a synchronous contactor having an asymmetrical characteristic. This condition would result from the device being so adjusted that the duration of engagement between the contact member 18 and the stationary contact 21 is of different duration than that of engagement with the contact 22. It will be seen that, while the frequency of contact action remains the same as before, the lack of symmetrical action is reflected in the output potential of one polarity lasting for a longer period of time than that of opposed polarity. The resultant potential wave will be of the nature shown at B; and, if this be impressed upon the primary winding of the transformer 33 the secondary output will still contain the desired fundamental-frequency component.

The graph at C represents the performance of the synchronous contactor with respect to an input component having a frequency the same as that of contactor operation, and, in this instance for the sake of clarity, shown as synchronous with said operation. It will be seen that the output voltage of the contactor now represents a completely rectified wave, the portions (shown dotted) of the half-waves or pulses near the zero value being eliminated by the momentary open condition of the contact system as polarity is reversed. If this wave be impressed upon the primary of the transformer 33 the secondary output will have a similar wave form but the zero will be shifted to an extent representing elimination of the direct-current component, and the resultant voltage will contain a pronounced component of twice the fundamental frequency. In the operation of servomotors and control devices the double frequency is not objectionable, and may sometimes be advantageously utilized. At the same time the absence of the fundamental component in the output eliminates the possibility of false balance conditions in the network from which the input to the contactor is derived. It may be shown that, whatever the phase relation between the contactor operation and the alternating component of the input voltage, the characteristic of complete omission of the fundamental frequency will be maintained, so long as operation of the contactor remains symmetrical with respect to both halves of the fundamental voltage wave.

The graph at D in Fig. 3 represents the action of the synchronous contacting device having an asymmetrical characteristic similar to that illustrated at B, when acting upon an input having an alternating component. It will now be seen that the successive pulses of alternating polarity are not treated in an identical manner, so that alternate pulses of potential in the output of the contactor are of different integrated values. Thus, while transformation of this potential wave will eliminate the direct-current component, and will produce a potential having a double frequency component, the output potential will also be characterized by a component having the fundamental frequency. It may be shown that the feature of recovery of the fundamental frequency will persist, without respect to phase relation between the impressed alternating component and the operation of the synchronous contactor, so long as the contactor performance is characterized by any lack of symmetry.

It may now be assumed that the contact combination 44—45 is released and these contacts allowed to function with vibration of the reed 41 under the influence of the electromagnet 43. Since the reed 41 will tend to vibrate at a frequency double that of the exciting current, and since the electromagnet 43 is energized from the same source as the winding 16 in the contactor 10, it follows that contacts 44 and 45 will tend to close and open the circuit between the contact 18 and the primary winding of the transformer 33 at a frequency double that of vibration of the reed 15. Thus, for each interval of engagement between the contact 18 and a co-acting fixed contact, the contacts 44 and 45 will close and open the circuit through said contact 18. Adjustment of the contacts 44 and 45 is made such that they will be in their closed condition for an interval shorter than those of engagement of the contact 18 with either of the contacts 21—22, however unequal may be the duration of the last named time intervals. The reed 41 is adjusted, if necessary by means of the phase shifting device 46, so that the time interval during which the contacts 44 and 45 are maintained in engagement is symmetrical with respect to each of the intervals of engagement of the contact 18 with the co-acting stationary contacts. In other words, this adjustment is made such that the middle of the contact interval of the former contacts coincides with the middle of the contact intervals of the latter contacts. Under this condition, the contacts 44 and 45 will tend to maintain the primary circuit of the transformer 33 open for a short interval after establishment of circuit conditions controlled by the contact 18, and to open said circuit prior to the separation of connections by the contact 18. Since the contacts 44 and 45 are engaged and separated once for each displacement of the contact 18 from its neutral, or open circuit, position, it will be seen that functioning of the contacts 44 and 45 is the same whatever the polarity of the current pulse in the winding of the electromagnet 43; and it follows that, with each circuit closing and opening established by the contact 18, the circuit is completed and interrupted uniformly by the contacts 44 and 45. This function is shown in the graph at E (Fig. 3), the performance of the contactor 10 being assumed to be the same as that shown at D, and the pulses as shown at D being completed by the dotted lines indicated at E. It will be seen that, since all pulses are thus defined in exactly the same manner by the contacts 44 and 45 those portions of the half-waves shown dotted at a and b in the graph at E, and which are responsible for lack of symmetry in the pulses applied to the primary of the transformer 33, are eliminated, thereby eliminating the source responsible for the component having the fundamental frequency. Thus the rectification of the alternating component appearing in the input to the contacting system results in a unidirectional current having a double frequency component, but wholly lacking any component having a fundamental frequency. While, as previously stated, the foregoing analysis has been shown as for a synchronous relationship between the alternating voltage and the vibrating contact elements, it will be obvious that a corresponding treatment for any other phase relationship will have similar results.

Figure 2:
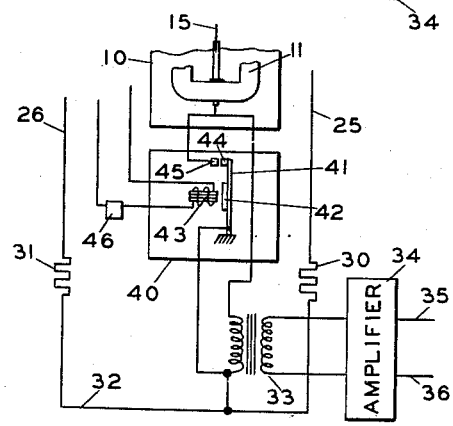
Fig. 2 shows an alternative arrangement of a portion of the diagram of Fig. 1.

The form of the invention shown in Fig. 2 is identical with that shown in Fig. 1 with exception of the fact that the contacts 44 and 45, instead of being in series with the primary winding of the transformer 13, are connected across the terminals of that winding in such a manner that when they are in a closed condition the winding is short-circuited. Thus, the potential existing between the contact 18 and the conductor 32 is applied to the winding of the transformer 33 only at those times when the contacts 44 and 45 are separated. While, in the form of the invention shown in Fig. 1 the contacts 44 and 45 are adjusted in such a manner that they engage and disengage within the shortest interval which can characterize the engagement of the contact 18 with either of its co-acting contacts, in the form of the invention shown in Fig. 2 the contacts 44 and 45 are adjusted to be maintained in a separated condition for an interval in each half-cycle, which lies wholly within said period of engagement. The result of this alternative interconnection between the contactor 40 and the contactor 10, is substantially identical to that of the arrangement shown in Fig. 1; and the potential applied to the primary winding of the transformer 33 will also be substantially as indicated by the graph E in Fig. 3.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. In combination, a pair of conductors, means for cyclically applying potentials from a unidirectional source to said conductors for intervals of alternating polarity, electrical means having terminals for receiving potentials from said conductors, and means for cyclically applying potentials from said conductors to said terminals for uniform intervals lying wholly within the first named intervals.

2. In combination, a pair of conductors, means operable at a predetermined frequency for cyclically applying potentials from a unidirectional source to said conductors for intervals of alternating polarity, electrical means having terminals for receiving potentials from said conductors, contact means interposed between said conductors and said terminals, and means for operating said contact means at double said frequency for cyclically applying potentials from said conductors to said terminals for uniform intervals lying wholly within the first named intervals.

3. In a device for detecting a unidirectional electrical potential from a source to be measured and producing an alternating potential therefrom, the combination of a pair of stationary contacts, means for connecting said contacts to said source, a movable contact engageable with said stationary contacts, means for causing said movable contact to engage alternately said stationary contacts at a predetermined frequency and for definite intervals of time, electrical means having terminals for receiving potentials from said contacts, and means for cyclically applying potentials from said contacts to said terminals for uniform intervals of time lying wholly within the first named intervals.

4. In a device for detecting a unidirectional electrical potential from a source to be measured and producing an alternating potential therefrom, the combination of a pair of stationary contacts, means for connecting said contacts to said source, a movable contact engageable with said stationary contacts, means for causing said movable contact to engage alternately said stationary contacts at a predetermined frequency and for definite intervals of time, electrical means having terminals for receiving potentials from said contacts, means for cyclically applying potentials from said contacts to said terminals for uniform intervals of time lying wholly within the first named intervals, the last mentioned means comprising contact means operable at double said frequency and interposed between the first mentioned contacts and one of said terminals.

5. In a device for detecting a unidirectional electrical potential from a source to be measured and producing an alternating potential therefrom, the combination of a pair of stationary contacts, means for connecting said contacts to said source, a movable contact engageable with said stationary contacts, means for causing said movable contact to engage alternately said stationary contacts at a predetermined frequency and for definite intervals of time, electrical means having terminals for receiving potentials from said contacts, conducting means having a pair of branches connecting said stationary contacts to one of said terminals, and means interposed between said movable contact and the other of said terminals for causing potentials to be applied cyclically from said contacts to said terminals for uniform intervals lying wholly within the first named intervals.

6. In a device for detecting a unidirectional electrical potential from a source to be measured and producing an alternating potential therefrom, the combination of a pair of stationary contacts, means for connecting said contacts to said source, a movable contact engageable with said stationary contacts, means for causing said movable contact to engage alternately said stationary contacts at a predetermined frequency and for definite intervals of time, electrical means having terminals for receiving potentials from said contacts, conducting means having a pair of branches connecting said stationary contacts to one of said terminals, and means interposed between said movable contact and the other of said terminals for causing potentials to be applied cyclically from said contacts to said terminals for uniform intervals lying wholly within the first named intervals, the last mentioned means comprising other contacts operable at double said frequency.

7. In combination with a pair of conductors, first contact means adapted to engage said conductors alternately and to remain in engagement therewith for definite intervals of time, second contact means having a single pair of contacts, means for operating said first contact means at a predetermined frequency, and means for operating said second contact means at double said frequency and for contacting intervals lying wholly within the respective intervals determined by said first contacting means, and means connecting said first and second contacting means in series.

8. In combination, a pair of stationary contacts adapted to have impressed therebetween a unidirectional electromotive force to be detected, a contact movable to engage said stationary contacts alternately, further contact means having a single pair of contacts, means for causing said movable contact to engage alternately said stationary contacts at a predetermined frequency, means for operating said further contact means at double said frequency, a transformer including a primary winding having two terminals, a divided circuit for connecting one of said primary terminals to said stationary contacts, means for connecting said movable contact to said further contact means, and connections between said further contact means and the other of said primary terminals, whereby said further contact means interrupts energization of said primary winding at the frequency of operation of said further contact means.

9. In combination, a transformer including a primary winding having two terminals, a pair of stationary contacts adapted to have impressed therebetween a unidirectional electromotive force to be detected, a movable contact adapted alternatively to engage said stationary contacts, further contact means having a single pair of contacts, a connection between said movable contact and one contact of said pair, a connection between the other contact of said pair and one of said primary terminals, a divided circuit connecting the other of said primary terminals to said stationary contacts, means for causing said movable contact to engage alternately said stationary contacts at a predetermined frequency and to remain in engagement therewith for definite intervals of time, and means for operating said further contact means at double said frequency whereby to interrupt energization of said primary winding at said double frequency.

10. In combination, a transformer including a primary winding having two terminals, a pair of stationary contacts adapted to have impressed therebetween a unidirectional electromotive force to be detected, a movable contact adapted alternatively to engage said stationary contacts, further contact means having a single pair of contacts, a connection between said movable contact and one contact of said pair, a connection between the other contact of said pair and one of said primary terminals, a divided circuit connecting the other of said primary terminals to said stationary contacts, means for causing said movable contact through equal resistances to engage alternately said stationary contacts at a predetermined frequency and to remain in engagement therewith for definite intervals of time, means for operating said further contact means at double said frequency whereby to interrupt energization of said primary winding at said double frequency, and an alternating-current circuit connected to said secondary winding.

11. In combination, a transformer including a primary winding having two terminals, a pair of stationary contacts adapted to have impressed therebetween a unidirectional electromotive force to be detected, a movable contact adapted alternatively to engage said stationary contacts, further contact means having a single pair of contacts, a connection between said movable contact and one contact of said pair, a connection between the other contact of said pair and one of said primary terminals, a divided circuit connecting the other of said primary terminals through equal resistances to said stationary contacts, means for causing said movable contact to engage alternately said stationary contacts at a predetermined frequency whereby to interrupt energization of said primary winding at said double frequency, and an alternating-current circuit connected to said secondary winding.

12. In combination, a pair of stationary contacts adapted to have impressed therebetween a unidirectional electromotive force to be detected, a contact movable to engage said stationary contacts alternatively, further contact means having a single pair of contacts, means for causing said movable contact to engage said stationary contacts alternately at a predetermined frequency, means for operating said further contact means at double said frequency, a transformer having a secondary winding and also having a primary winding with two terminals, a divided circuit for connecting one of said primary terminals to said stationary contacts, means for connecting said movable contact to said further contact means, connections between said further contact means and the other of said primary terminals, whereby said further contact means interrupts energization of said primary winding at the frequency of operation of said further contact means, and an alternating-current circuit connected to said secondary winding.

13. In combination, a transformer having a secondary winding and also having a primary winding with two terminals, a pair of stationary contacts adapted to have impressed therebetween a unidirectional electromotive force to be detected, a movable contact adapted alternatively to engage said stationary contacts, further contact means having a single pair of contacts, a connection between said movable contact and one contact of said pair, a connection between the other contact of said pair and one of said primary terminals, a divided circuit connecting the other of said primary terminals to said stationary contacts, means for causing said movable contact to engage alternately said stationary contacts at a predetermined frequency and to remain in engagement therewith for definite intervals of time, means for operating said further contact, means at double said frequency whereby to interrupt energization of said primary winding at said double frequency, and an alternating-current circuit connected to said secondary winding.

14. In combination, a pair of stationary contacts connectible to a source of unidirectional potential, a movable contact engageable with said stationary contacts, means for causing said movable contact to engage alternately said stationary contacts at a predetermined frequency and for definite intervals of time, a transformer including a primary winding for receiving potentials from said contacts, and means for cyclically applying potentials from said contacts to said winding for uniform intervals of time lying wholly within the first named intervals, the last mentioned means comprising contact means operable at double said frequency and interposed between said movable contact and said winding.

15. In a device for detecting a unidirectional electrical potential from a source to be measured and producing an alternating potential therefrom, the combination of a pair of stationary contacts, means for connecting said contacts to said source, a movable contact engageable with said stationary contacts, means for causing said movable contact to engage alternately said stationary contacts at a predetermined frequency and for definite intervals of time to convert said unidirectional potential into an alternating potential of said frequency and of magnitude corresponding to that of said unidirectional potential, electrical means having terminals for receiving potentials from said contacts, and connections between said contacts and said terminals for applying said potentials to said terminals, said connections comprising cyclically operating means for maintaining the intervals of application of said potentials to said terminals entirely within the intervals of engagement of said movable and said stationary contacts.

References Cited in the file of this patent

UNITED STATES PATENTS

| Number | Name | Date |
| --- | --- | --- |
| 1,271,732 | Leich | July 9, 1918 |
| 1,286,034 | Leich | Nov. 26, 1918 |
| 1,382,745 | Schoenwolf | June 28, 1921 |
| 2,485,948 | Williams et al. | Oct. 25, 1949 |